July 10, 1934.  H. P. McGRATH  1,965,663
RAKE CLEANER
Filed June 6, 1932
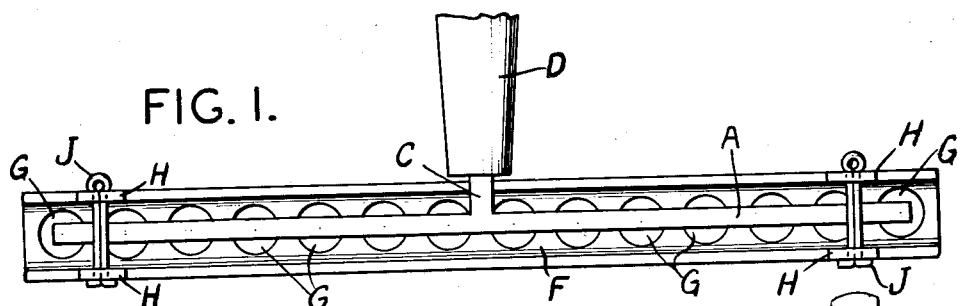
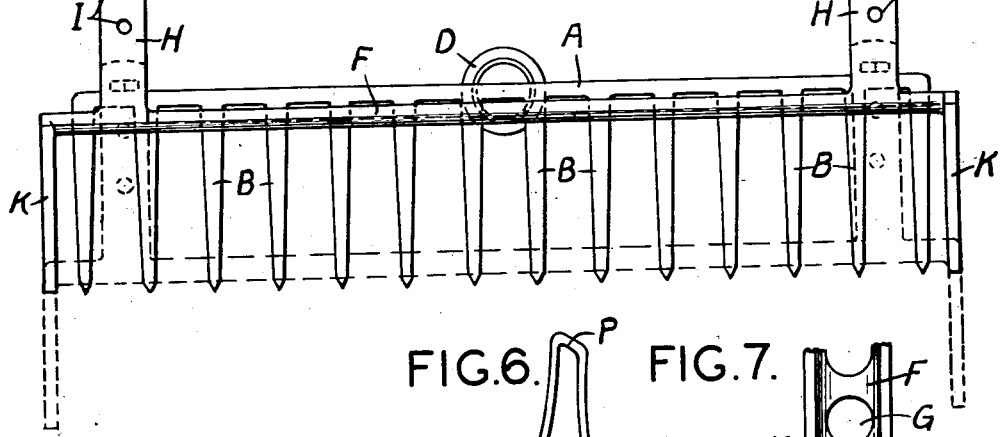
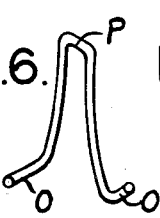
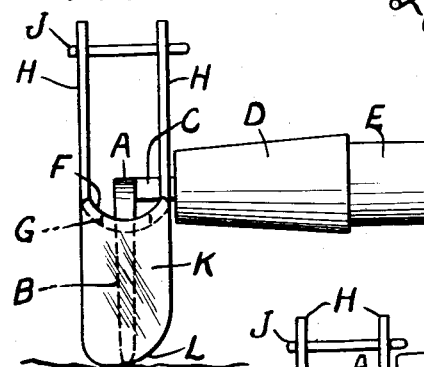
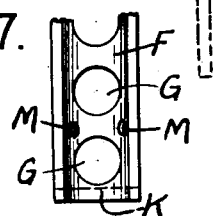
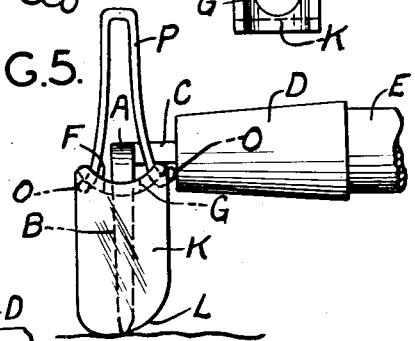
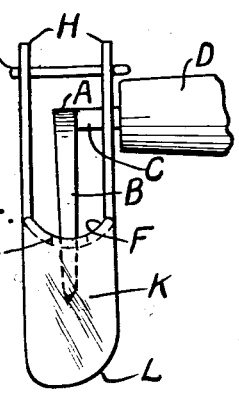
INVENTOR:
HARRY P. McGRATH
BY J. Henry Kinealy
ATTORNEY Patented July 10, 1934

1,965,663

UNITED STATES PATENT OFFICE 1,965,663

RAKE CLEANER

Harry P. McGrath, St. Louis County, Mo.

Application June 6, 1932, Serial No. 615,483

2 Claims. (Cl. 55—146)

My invention relates to cleaning attachments for rakes, and more particularly rakes commonly used for removing leaves, grass and other debris from lawns and garden plots. It is well known that when in use, such rakes become clogged by the refuse matter they collect, because the teeth are necessarily close together to enable the collection of fine leaves and grass. Thus, it is necessary for the user to clear the teeth of the rake by hand, which, of course, is an unpleasant operation, consumes time and retards the work.

One object of my invention is to provide a cleaning bar for attachment to rakes that is truly automatic in operation and not dependent upon the action of springs or separate manipulation.

Other objects of my invention are to provide a cleaning bar which can be applied or removed from the rake head without changing or altering the rake; to provide a cleaning bar that is effective though simple, and is rugged and durable though cheap to manufacture.

With these and other objects in view my invention comprises in its simplest form a perforated cleaning bar or plate adapted to fit over the teeth of the rake, links or other attaching means to connect said bar to the head of the rake, and downwardly extending feet or supporting means to hold the bar in raised position when the rake is in use. The bar and supporting means drop vertically along the teeth when the rake is raised from the ground, and automatically clean the rake with no effort on the part of the user.

The true spirit of my invention will be understood from a consideration of the accompanying drawing in view of the following detailed description: Fig. 1 is a top view of a rake with my cleaning device attached thereto; Fig. 2 is a front view in elevation of a rake with my cleaning device attached thereto, showing the bar held in raised position; dotted lines showing the position when the bar is dropped; Fig. 3 is a side view showing the bar in raised position; Fig. 4 is a side view, the same as Fig. 3, showing the bar in dropped position; Fig. 5 is a side view showing the bar in raised position, but showng a variation in the attaching means; Fig. 6 is a view of the attaching means used in Fig. 5; and Fig. 7 is a detail of a part of the bar.

Similar reference numerals refer to like parts in all figures of the accompanying drawing: The rake shown is a common garden rake having a head A, teeth B projecting at right angles therefrom and a neck C connecting the head A with the socket D of the handle E. It is not intended to limit the scope of my invention to the form of rake here illustrated, as it is to be understood that my device may be applied to any other form of rake.

My device consists of a cleaning bar F perforated with holes G to permit engagement with the teeth B. Near each end of the bar F and attached thereto are upwardly extending parallel arms or links H to receive the head A. The arms H are provided with holes I to receive cotter pins J as clearly shown in Figs. 1 and 2. As shown in Fig. 2 I provide the arms H with holes I at different stages to permit the desired adjustment on various forms of rakes. At each end of the bar F are downwardly extending feet or supporting means K formed with gliding surfaces L.

In the preferred embodiment of my invention the bar F is curved as shown in cross section in Figs. 3, 4 and 5 to permit the dropping of the bar F almost to the bottom of the teeth B without losing engagement thereon. The attaching means in either embodiment shown should be long enough to permit sufficient vertical movement of the bar along the teeth B to properly clean the teeth of the rake and still retain engagement by means of the perforations G engaging the teeth. I prefer that the perforations G be large enough to permit free vertical movement along the teeth B of the rake, but also desire that they be small enough to actually clean the teeth of all accumulated debris. The downwardly extending feet or supporting means K are, in turn, just slightly shorter than the teeth B to allow free engagement of the teeth of the rake with the ground and still provide support to the bar F when the rake is in use. The downwardly extending feet or supporting means K are provided with gliding surfaces L to effect a smooth and gliding contact with the ground when the rake is in use. This feature enables the supporting means K to carry the weight of the bar F without uprooting or injuring the surface upon which the rake is used. The gliding surfaces L carry the weight of my device and prevent its weight from bearing down on the rake to cause undue strain upon the user.

In the variation of the attaching means shown in Figs. 5, 6 and 7 I provide holes N in the bar F through which are inserted the ends O of the hook or link P. To facilitate easy attachment over the rake head to the bar I prefer that one end of the hook or link P be bent at right angles to the other end. This permits insertion of one end without restricting the movement of the hook itself to secure engagement with the other end.

With this detailed description in mind, the manner of using my device is obvious. The teeth B are simply inserted through the perforations G so that the rake head A is within the attaching means or arms H. The cotter pins J are inserted to prevent vertical movement beyond the lower ends of the teeth B. When the rake is in use the downwardly extending feet or supporting means K contact with the ground and hold the bar F in raised position along the head A. When the rake is raised from the ground, the bar F drops vertically along the teeth and forces all refuse matter clear of the rake. Thus, the operation of my cleaning device is truly automatic and not subject to any separate manipulation on the part of the user. The bar is always in raised position when the rake is on the ground, and the weight thereof forces it downwardly when the rake is raised.

While I have hereabove shown the most improved form of my invention, I wish it understood that not all the features are essential thereto, or necessarily made in the exact form shown. My device may be made with one or more attaching means and in turn with one or more supporting means without departing from the scope of my invention. Various changes and modifications in the exact form of the attaching means and links as well as the downwardly extending feet or supporting means may be made without departing from the spirit of my invention.

What I claim as new and desire to secure by Letters Patent, is:

1. A cleaning device for rakes comprising a bar adapted to rise and fall vertically along the teeth of said rake, a link for attaching said bar to said rake whereby vertical movement of said bar beyond the lower ends of said teeth is prevented and supporting means for said bar extending downwardly beyond the lower end of said teeth to engage the ground when said rake is used whereby said bar will be held at the upper ends of said teeth but will move downwardly to clean said teeth when said rake is raised from the ground.

2. A cleaning device for rakes comprising a bar adapted to rise and fall vertically along the teeth of said rake, a link for attaching said bar to said rake whereby vertical movement of said bar beyond the lower ends of said teeth is prevented and supporting means for said bar extending downwardly beyond the lower end of said teeth and having a gliding surface to engage the ground when said rake is used whereby said bar will be supported at the upper ends of said teeth but will move downwardly to clean said teeth when said rake is raised from the ground.

HARRY P. McGRATH.